(12) United States Patent
Johnson et al.

(10) Patent No.: US 10,298,016 B1
(45) Date of Patent: May 21, 2019

(54) SYSTEMS, METHODS AND COMPUTER PROGRAM PRODUCTS FOR ELECTRIC GRID CONTROL

(71) Applicant: National Technology & Engineering Solutions of Sandia, LLC, Albuquerque, NM (US)

(72) Inventors: Jay Johnson, Albuquerque, NM (US); Mark A. Smith, Albuquerque, NM (US); David A. Schoenwald, Albuquerque, NM (US); Mohamed El Khatib, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 95 days.

(21) Appl. No.: 15/425,815

(22) Filed: Feb. 6, 2017

Related U.S. Application Data (60) Provisional application No. 62/292,008, filed on Feb. 5, 2016.

(51) Int. Cl.
*H02J 3/38* (2006.01)
*H02J 13/00* (2006.01)

(52) U.S. Cl.
CPC .......... *H02J 3/382* (2013.01); *H02J 13/0006* (2013.01)

(58) Field of Classification Search
None
See application file for complete search history.

(56) References Cited

U.S. PATENT DOCUMENTS

| | | | | |
|---|---|---|---|---|
| 8,682,495 B2 * | 3/2014 | Carralero | .................. | G06F 1/26 700/286 |
| 2009/0076661 A1 * | 3/2009 | Pearson | ............ | H01M 8/04619 700/291 |
| 2014/0200723 A1 * | 7/2014 | Roy | ........................ | G06Q 50/06 700/291 |

* cited by examiner

*Primary Examiner* — Paul B Yanchus, III
(74) *Attorney, Agent, or Firm* — Daniel J. Jenkins (57) ABSTRACT

Systems, methods and computer program products for maintaining and controlling distributed energy resources (DERs), such as wind, solar, water and storage renewable energy resources, within an acceptable error margin are disclosed. The systems and processes control the energy output of these DERs in real time within the error margin.

10 Claims, 4 Drawing Sheets

SYSTEMS, METHODS AND COMPUTER PROGRAM PRODUCTS FOR ELECTRIC GRID CONTROL

CROSS-REFERENCE TO RELATED APPLICATIONS

This application claims priority to U.S. Provisional Patent Application No. 62/292,008, filed on Feb. 5, 2016, entitled "SYSTEMS, METHODS AND COMPUTER PROGRAM PRODUCTS FOR ELECTRIC GRID CONTROL," the entirety of which is incorporated herein by reference.

STATEMENT CONCERNING FEDERALLY SPONSORED RESEARCH

This invention was developed under Contract DE-AC04-94AL85000 between Sandia Corporation and the United States Department of Energy.

FIELD OF THE INVENTION

The present invention relates to electrical power grids, and specifically to systems, methods and computer program products that control power to an electrical grid from distributed energy resources.

BACKGROUND OF THE INVENTION

An increasing number of state and national interconnection standards are requiring Distributed Energy Resources (DERs) to include grid-support functionality. These capabilities, along with the growing number of communications-enabled DERs, make it possible for 3rd party aggregators to provide a range of high-level grid services such as voltage regulation, frequency regulation, and contingency reserves. The increasing number of these DER impact grid bulk system reliability as grid inertia and governor control are displaced and frequency deviations from renewable energy (RE) variability become increasingly more common, making bulk system reliability much more challenging to maintain. This can result in compromises to frequency response, voltage stability, and other metrics of grid reliability. Due to the sheer number of DERs and their small sizes, it is not practical for bulk system operators to optimize and control individual DERs.

Electrical grid operators are concerned about the consequences to their grid operations from increasingly higher penetrations of DERs, especially intermittent RE resources, such as solar photovoltaic and wind energy. Therefore, instituting frequency response reserves with DERs in accordance with utility, Independent System Operator (ISO)/Regional Transmission Organization (RTO), and NERC requirements are critical for future grid resiliency.

There is a need for systems and methods that can support high standards of grid reliability, while accommodating increasing penetrations of DERs on the grid.

SUMMARY OF THE INVENTION

The disclosure is directed to systems, methods and computer program products for maintaining in real time dispatchable aggregations including distributed energy resources (DERs) within an acceptable error margin.

In an embodiment, a system is disclosed that includes an optimization block, a unit commitment process, a summation node, and a controller. The optimization block receives an overall power request from an operator and outputs an overall reference power signal and at least one individual power source request for a corresponding at least one individual power source of one or more power sources. The unit commitment processor receives at least one individual power source status comprising current power level from the corresponding at least one individual power source and generates and outputs a delta reference power signal for the corresponding at least one individual power source, wherein the delta reference power signal corresponds to an amount of power to be added to one or more of the one or more individual power sources to bring total power of the one or more power sources to equal an overall reference power level of the at least one individual power source. The summation node that receives the at least one individual power source request for a corresponding at least one individual power source, and also receives the delta reference power signal for the corresponding at least one individual power source, and outputs an adjusted reference power signal that is the sum of the at least one individual power source request and the delta reference power signal for the corresponding at least one individual power source. The controller that receives the overall reference power signal from the optimization block, and also receives the adjusted reference power signal for the at least one individual power source, and also receives a power status comprising an indication of current power level of the at least one individual power source, and outputs a power command signal to the at least one individual power source. The at least one power source is selected from a group consisting of solar, geothermal, wind, water and storage power sources that output energy to an electrical grid.

In another embodiment, a method is disclosed that includes receiving an overall power request for a grid from a user into a management system; receiving a status from at least one distributed energy resource into the management system; receiving a distributed energy resource output comprising an indication of current power level from the at least one distributed energy resource; and calculating a distributed energy resource control signal and sending the distributed energy resource control signal to the at least one distributed energy resource. The distributed energy resource control signal is calculated by a process including determining a difference in an amount of power generated by the distributed energy resource and a set point amount of power for the distributed energy resource; summing the difference with an initial set point amount of power for the distributed energy resource to generate a delta reference power amount; adding the delta reference power amount to a reference power level amount to generate an adjusted power level amount for the at least one distributed energy resource; calculating a power level for the at least one distributed energy resource from an overall reference power level for the grid, the adjusted power level amount for the at least one distributed energy resource, and the status from at least one distributed energy resource; and communicating the power level for the at least one distributed energy resource to the at least one distributed energy resource.

In another embodiment, a computer program product stored on a non-transitory computer readable medium is disclosed. The computer program product, when executed by a process, is configured to: determine a difference in an amount of power generated by the distributed energy resource and a set point amount of power for the distributed energy resource; sum the difference with an initial set point amount of power for the distributed energy resource to generate a delta reference power amount; add the delta reference power amount to a reference power level amount to generate an adjusted power level amount for the at least one distributed energy resource; calculate a power level for the at least one distributed energy resource from an overall reference power level for the grid, the adjusted power level amount for the at least one distributed energy resource, and the status from at least one distributed energy resource. The calculated power level is communicated to the distributed energy resource to set power level of the distributed energy resource in an electrical grid.

One objective of the system is to maintain the summation of all DERs outputs within a defined error margin from the reference power output of the DERs aggregation received from an electric utility, Independent System Operator (ISO) Regional Transmission Organization (RTO) and/or other third party entities which act as aggregators.

An advantage of the disclosed systems, methods and computer program products is that they provide services to the grid that help maintain frequency response, voltage stability, and other metrics of reliability in accordance with utility, Independent System Operator (ISO)/Regional Transmission Organization (RTO), and North American Electric Reliability Corporation (NERC) requirements that provide for future grid resiliency.

Another advantage would be that by aggregating different DERs, the disclosed systems, methods and computer program products facilitate the participation of a large number of diverse DERs in supporting grid services, enabling increased penetrations of renewable energy resources on the grid by reducing the need for utilities to maintain dedicated assets to provide these grid services.

Another advantage would be that the aggregation of DERs does not necessarily have a single point of connection to the grid or depend too heavily on just one DER. This makes the aggregation of DERs robust to individual DER power limitations, dropouts, or lack of availability.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

The figures depict embodiments of the present invention for purposes of illustration only, and are not necessarily drawn to scale. One skilled in the art will readily recognize from the following discussion that alternative embodiments of the structures and methods illustrated herein may be employed without departing from the principles of the invention described herein.

DETAILED DESCRIPTION OF THE INVENTION

Various technologies pertaining to control of an aggregation of DERS will now be described with reference to the drawings, where like reference numerals represent like elements throughout. In addition, a functional block diagram of an exemplary system is illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware-only configurations that perform certain functionality.

The present disclosure is directed to systems, methods and computer program products for maintaining dispatchable aggregations including distributed energy resources (DERs) within an acceptable error margin, in real time, despite the presence of renewable energy (RE) resources that can rapidly fluctuate over time. The systems, methods and computer program products can provide grid support services to grid operators, as grid operators will see these aggregations as a single entity. These aggregations do not need to have a single point of interconnection to the grid, but instead can connect to the grid at geographically dispersed points. Through the aggregation of different DERs, large numbers of diverse DERs can participate in grid support services. This promotes increasing renewable penetrations on the grid by eliminating the need for dedicated grid support services.

The systems, methods and computer program products integrate power output tracking errors to continuously re-assign and dynamically control DERs to maintain the overall reference power output of the aggregation within a defined error margin. The systems, methods and computer program products can:

handle large numbers of DERs over a geographically diverse area, are robust to variable fluctuations in DER power outputs;

compensate, in real time, for the drop out of any particular DER or the inability of any DER to achieve or maintain its reference power output;

access a communication network to receive DER data and dispatch reference power outputs to a geographically diverse set of DERs; and be resilient to the effects of a communication network including latencies, data loss, and cyber security issues.

Figure 1:
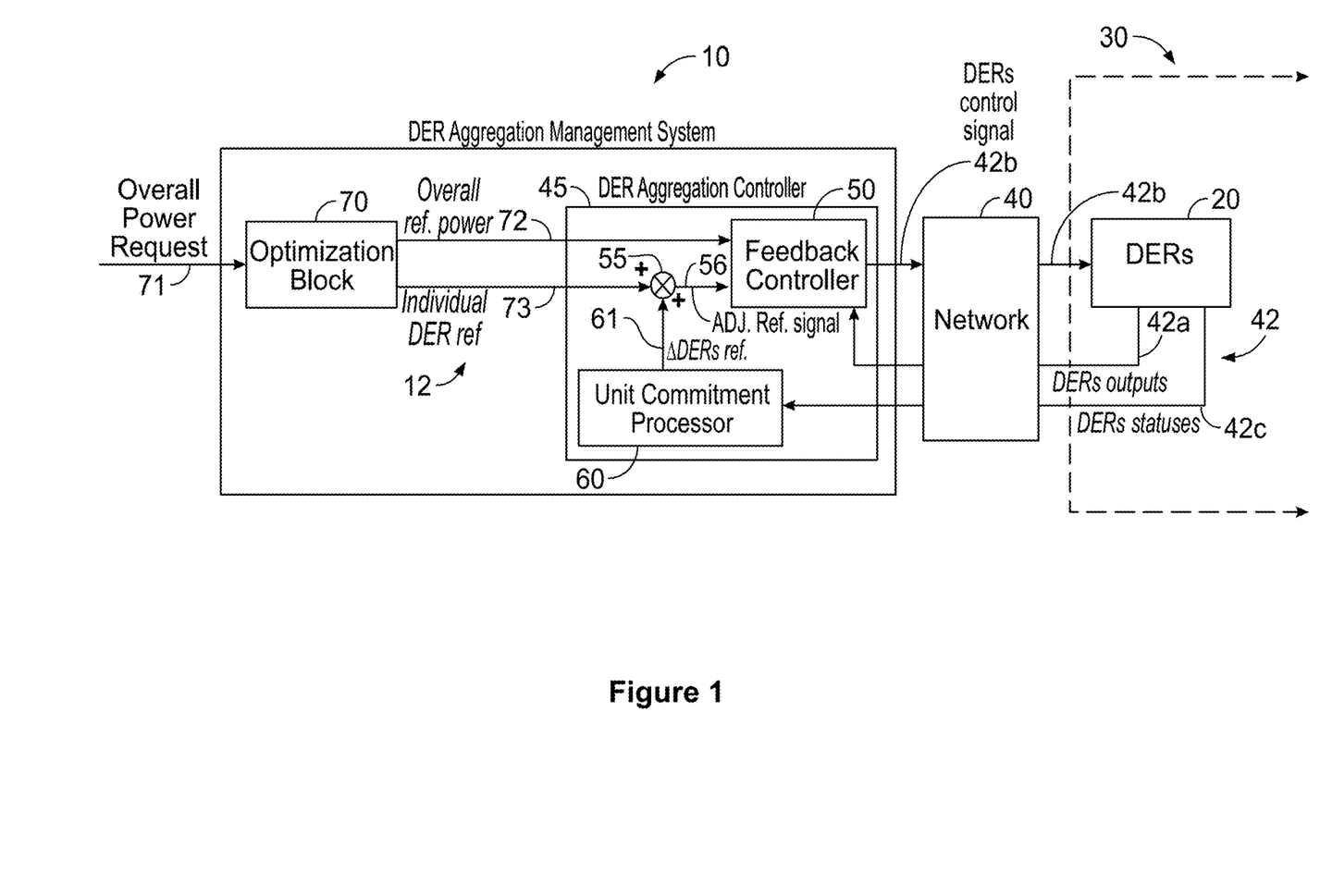
FIG. 1 illustrates an embodiment of a DER Aggregation Management System according to the present disclosure.

FIG. 1 illustrates an embodiment of a DER Aggregation Management System (system) 10 for controlling or operating one or more DERs 20 that are part of and provide energy to an electrical grid (grid) 30. Each DER within the one or more DERs 20 provides electricity 22 to the grid 30.

The one or more DERs 20 includes $n^{th}$ number of DERs, or in other words, DER1, DER2, DER3, . . . DERn$^{th}$. The one or more DERs 20 may include one or more power sources or loads. The one or more power sources may be one or more power generation and/or power storage sources. The one or more power generation sources may be a renewable resource power generation source such as, but not limited to solar, geothermal, wind and water. For example, the wind power generation source may be a single wind turbine or wind farm. The solar power generation source may be, but is not limited to, photovoltaic (PV) and concentrated solar power (CSP) sources. For example, the solar power generation source could be a home solar system or a commercial solar field. The water source may be, but is not limited to one or more hydroelectric, wave power generation and pumped hydro storage power generation/storage sources. The one or more loads represent a demand response action in which a load is controlled. Demand response is a type of DER in that a device (light, refrigerator, electric furnace, etc.) is a load that is turned off, which serves the same purpose as generation.

The grid 30 may be a microgrid, local, regional or national electrical grid. The grid 30 may be connected to and/or include one or more power generation units, power loads and/or power storage systems (not shown), as is well understood in the field. The term "microgrid" as used herein is defined as localized, small-scale power grids that can operate independently of a centralized grid (islanded mode) or as a connected part of the centralized grid (grid-connected mode). The microgrid includes at least one power source, such as a power generation or storage device, and a load.

The system 10 receives a target aggregate power level or overall power request 71 and calculates set-points for each of the DERs based on feedback from the DERs or other measurements. As can be seen in FIG. 1, the system 10 includes a DER Aggregation Controller 45 and an Optimization Block 70. The DER Aggregation Controller 45 includes a Feedback Controller 50 and a Unit commitment processor (processor) 60. In this exemplary embodiment, the controller 50, processor 60 and optimization block 70 are shown as individual components, however, in other embodiments one or more of the Feedback Controller 50, processor 60 and optimization block 70 may be combined with/or include one or more components, such components being, but not limited to computer processor unit(s), mainframes, data acquisition equipment, real-time control hardware, communication network devices (e.g. receivers and transmitters), signal conditioning equipment, power amplifiers, power protection hardware, power safety equipment and combinations thereof.

The system 10 is connected to the one or more DERs 20 by a communication network (network) 40. The network 40 provides communications connectivity between the system 10 and each of the one or more DERs 20 to allow for commands or control signals from the system 10 to the one or more DERs and to allow for DER system information from the one or more DERs to be provided to the system 10. In this exemplary embodiment, the network 40 is shown as a stand-alone system. In another embodiment, the network 40 may be integrated or partially integrated into one or more of the components of system 10. In this exemplary embodiment, the network 40 is both connected to the controller 50 and the processor 60. In another embodiment, the network 40 may be connected to the controller 50 and/or processor 60.

The network 40 includes paths, channels or links 42 that include specific data streams between the system 10 and the one or more DERs 20. One or more of the links 42 exist between the system 10 and each of the one or more DERs 20. The links 42 may be wireless and/or wired connections or transmission systems, such as, but not limited to cellular, satellite, and microwave and/or fiber optic, coaxial cable, and power line carriers. Also, the links 42 may be separate, combined or connected with one another over one or more transmission systems and/or via various pathways to and/or through various components of the system 10. For example, in this exemplary embodiment, output link 42a and command dispatch link 42b are shown as separate links, however, in other embodiments, one or more of the network links may be separate or combined links.

Link 42a, which may be referred to as a DER(s) output link, provides DER(s) output signals containing DER data (collectively be referred to as DER(s) outputs), from the one or more DERs 20 to the controller 50. The DERs outputs includes one or more nameplate capabilities, operating modes and limits, reactive powers, active powers, apparent powers, and other DER measurements of one or more DERs that indicate or include the current, present or otherwise real time power output of the one or more DERs. In an embodiment, the DER outputs may be real time power levels transmitted at least once a second or a slower than real time power level transmitted at data rates approximately once per 10s of seconds or minutes.

Link 42b, which may be referred to as a command dispatch link, provides reference power command signals including power commands (collectively referred to as power commands) from the controller 50 to the one or more DERs 20. The power commands may include active power outputs, scheduled outputs, and autonomous capabilities that dynamically change the output of the DER based on local DER measurements.

Link 42c, which may be referred to as DER(s) status link, provides DER(s) status signals including one or more DER status (collectively referred to as DER status) from the one or more DERs 20 to the Unit Commitment Processor 60. The DER status includes the operational condition for that particular DER. The operational status directly or indirectly includes the current power output of the one or more DERs. The DERs status may include whether or not the DER(s) is providing power to the grid 30, whether a DER is on/off-line or otherwise unavailable, or a status of any of the operating modes and their settings, and some unknown or otherwise know state or the schedules for any of the aforementioned statuses. For example, if a DER is offline, it's power output is zero. The DER(s) status may also include an indicator that one or more of the DERs is providing power at a level less than, equal to, or greater than the desired output, and/or may include that the DER cannot achieve the desired power output level.

The system 10 also includes one or more system links 12 that connect the controller 50, processor 60 and optimization block 70 as shown in FIG. 1. The system links 12 may be wired and/or wireless, and may be selected from such systems as embedded electronics and controls on a single board, multiple electronic boards on a rack mounted system, or other custom designed setups. Also, the system links 12 may be separate or combined with one another over one or more transmission systems and components of the system 10.

The processor 60 receives the DERs statuses 42c from the DERs 20, indicating which DERs are on- and offline and/or unable to produce the required power due to other reasons (for example if a storage unit ran out of charge or if the maximum output of a PV system has changed since its reference power output was calculated by the optimization block). From the statuses, the processor 60 can determine a system power level shortage. For example, if DER1 (see FIG. 2) is offline and DER1 has a power generation demand or reference output of 10 MW, then there is a 10 MW shortage or error signal.

The processor 60 then generates and outputs a delta (Δ) DERs reference signal 61, which is provided to a summation node 55. The summation node 55 is a processor that includes hardware and software for performing and/or executing one or more executable instructions to generate and output the adjusted DER reference signal 56. In an embodiment, the summation node 55 may be part of the controller hardware and/or software. The summation node 55 may be an individual component, or may be integrated into the controller 50 or processor 60.

The Δ DERs reference signal 61 is an amount of power to be added to one or more of the online or available DERs to bring the overall power equal to the overall reference power 72 of the system, within an acceptable error margin. The Δ DERs reference signal 61 is a design choice determined by the processor 60 based on factors including, but not limited to the power generation capacity of each DER, DERs ramp rates, generation prices, DER response priority, or other factors based on the particular system conditions and the error in overall power output between the current aggregation of DERs and the overall reference power. The processor 60 includes hardware and software for performing and/or executing one or more executable instructions to determine system power shortfall and distribute the shortfall via Δ DERs reference values to one or more of the online DERs in the system.

The optimization block 70 calculates the desired dispatch commands for each DER given the target power level or overall power request 71. The desired dispatch command calculation is performed over some specified time period, for example, once every 5 minutes. The optimization block 70 receives the overall power request 71 from a requestor (not shown), such as, but not limited to a utility, grid operator, ISO, RTO or market. The optimization block 70 then outputs an overall DER reference power signal 72 to the controller 50 for the amount of power requested by the requestor. The overall DER reference power signal 72 is based on the needs of the utility, grid operator, ISO, RTO, or market. To meet this reference power within the required tolerance, a set of factors is accounted for in the optimization block, such as, but not limited to total number DERs, available power, and renewable energy, demand, and weather forecasts.

The optimization block 70 outputs individual DER reference signals 73 that act as the initial DER power generation set points for the controller 50. The amount of power generation from the optimization is determined based on one or more factors including, but not limited to DER unit power cost, generation capacity, forecasts of renewable power availability, state of charge of any storage units, ramp rate, cyber security issues associated with a specific DER and any terms imposed by an existing contract for a specific DER. The optimization block 70 includes hardware and/or firmware and/or software for performing and/or executing one or more executable instructions to generate and output the overall reference power 72 and the individual DER references 73. For example, the optimization block 70 may be a stochastic or deterministic unit commitment solution.

In another embodiment, the optimization block 70 is not a separate component and the optimization block functions are performed by the controller 50, such that the overall power request is received by the controller. In yet another embodiment, the individual DER references are their current output power or may be a pre-set or otherwise selected power level.

The individual DER reference 73 is provided to a summation node 55 where it is added to the Δ DERs reference signal for each DER to arrive at an adjusted DER reference signal, which is provided to the controller 50. The adjusted reference signal 56 is the sum of the individual DER reference signal and the Δ DERs reference signal. For example, the optimization block 70 may output an individual DER reference of 10 MW for DER1 (see FIG. 2), and the processor 60 may output a Δ DERs reference of 2 MW for DER1. An adjusted reference signal for 12 MW is then provided to the controller 50.

The controller 50 receives the overall reference power signal 72 from the optimization block 70 and the adjusted DER reference signal 51 from the summation node 55. In addition, the controller receives DERs outputs 42a from the DERs via the communication network 40. The controller 50 then calculates a DERs control signal 42b that is provided to the one or more DERs 20. The DERs control signal 42b is calculated to compensate for errors in the DERs aggregated power output and the individual DER power output. This DERs control signal 42b, which may be referred to as a power adjustment signal, is calculated at a prescribed time interval, for example, each second or other update rate based on the inputs and the specific design of the controller 50.

Stated another way, the individual DER reference signals 73 represent the desired power outputs of the DERs. The actual DER outputs will likely deviate some from the reference commands. It is the error between the actual power outputs and reference power commands that initiate a control response. When this error is zero (or within some acceptable error margin) then the control response for that DER is constant. The DER control signal 42b is provided to one or more of the DERs 20 to compensate for any real-time discrepancies in aggregated DER power output and individual DER power output.

The controller 50 may be any suitable controller such as, but not limited to, a proportional-integral (PI) or a proportional-integral-derivative (PID) controller. The controller 50 includes hardware and software for performing and/or executing one or more executable instructions to dispatch the control signal across the communication network to one or more of the DERs.

Figure 2:
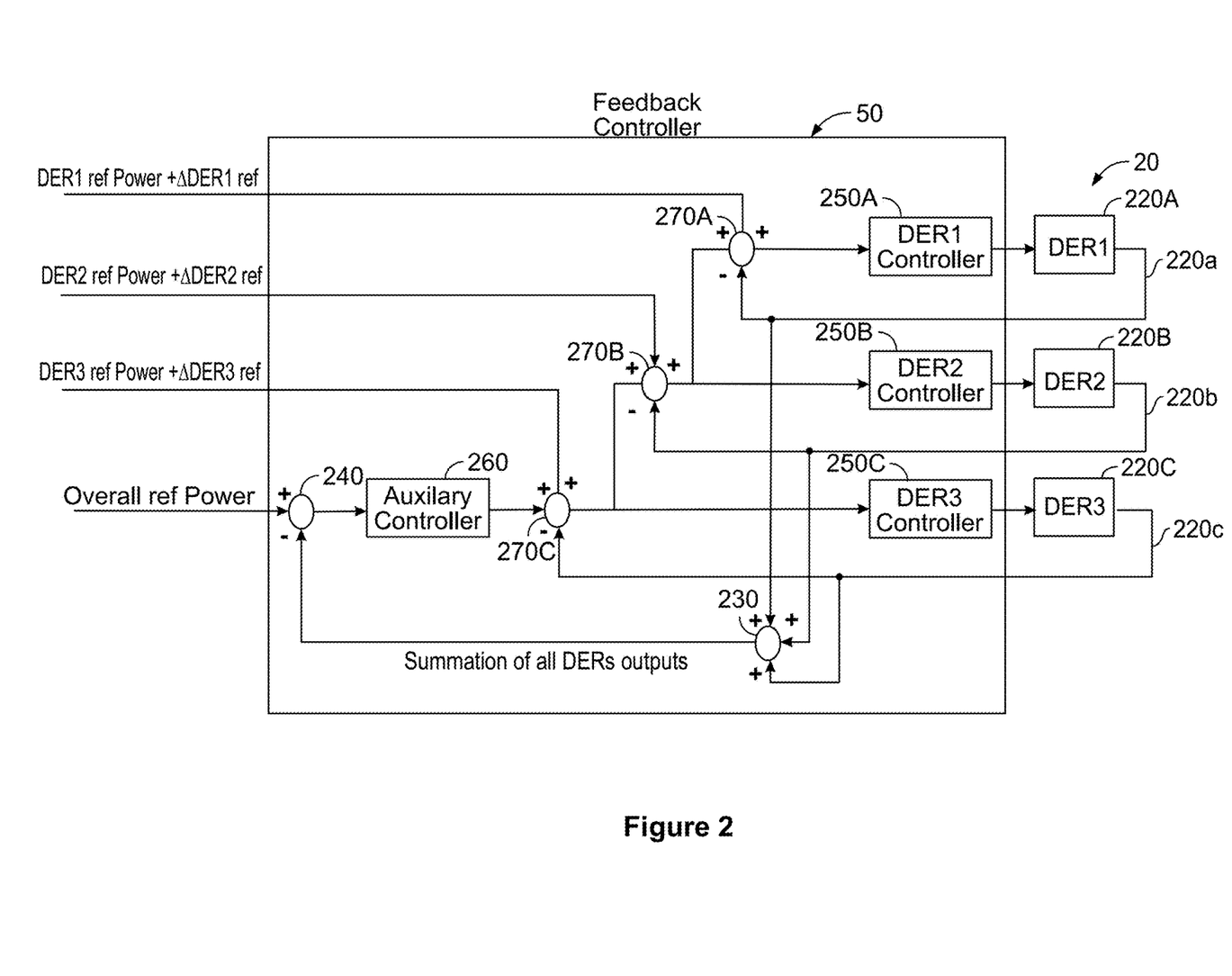
FIG. 2 is a more detailed illustration of the controller and associated DERs of FIG. 1.

FIG. 2 is a more detailed illustration of an embodiment of the controller 50 and DERs 20 shown in FIG. 1. In this exemplary embodiment there are three DERs labeled DER1, DER2, DER3, respectively. In this exemplary embodiment, there are three individual DERs, however, in other embodiments, there may be one or more (n number of) DERs forming the aggregate DERs. The assignment of a particular DER to a DER number is a design choice.

The $n^{th}$ DER is the Swing DER, which is the DER that compensates, in steady state, for the real-time error between the aggregated DER power outputs and the overall power request, assuming this error is modest such that redistribution of the error between DERs, by processor 60, is deemed not necessary. The selection of the swing DER is a design choice and could be chosen based on, but not limited to, its fast response time to a desired power output. In the example depicted in FIG. 2, DER3 is the Swing DER.

If the overall power output error is too large for the Swing DER to compensate, then two or more DERs may be chosen to collectively serve as swing DERS. This iterative assignment of swing DERs may continue, especially in the event of a large error in overall power output until most or even all of the DERs are participating in the real-time power compensation.

The other two DERs, DER2 and DER3 in this example, will continue to track their reference power commands possibly subject to minor transient errors. During transient period, all DERs will respond to an error in the overall aggregation output. However, in steady state, each DER will continue to follow its reference power except the swing DER. The logic in the unit commitment processor will determine if readjusting the reference powers of the DERs is necessary or not. For instance, if the shortfall is small then it's probably not worth it. Regardless of the unit commitment action though, the swing DER mechanism will act as described above. The Swing DER will always compensate for any error in the overall DER aggregation, because it is driven by the overall aggregation error signal.

For example, in FIG. 2, assume that the overall reference is 30 MW distributed evenly between the three DERs. Let DER1 be a storage which in real time appeared to be only able to produce 9.5 MW. So instead of readjusting the reference power of DER1 and DER2 to compensate for the 0.5 MW, the swing DER (DER3) will, in steady state, produce an extra 0.5 MW to make sure the total output is still 30 MW. This will indeed be the case since the overall aggregation error is added to the reference signal of DER3, so DER3 can only reach steady state if the aggregation error is zero.

Another scenario could be that DER1 is a PV system and a cloud causes the output of the PV to drop temporarily. In this case, instead of calculating new Δ DERs and adjust all the ref powers, the swing bus could compensate for the temporary drop of the PV output to maintain the overall output of the aggregation constant.

As can be seen in FIG. 2, the DERs 20 are shown as individual DER 220A, 220B, 220C. In this exemplary embodiment, there are three individual DERs, however, in other embodiments, there may be one or more DERs forming the aggregate DERs. The controller 50 includes DER controller devices 250A, 250B, 250C that control individual DER 220A, 220B, 220C, respectively.

As can be seen in FIG. 2, each DER 220A, 220B, 220C outputs a DER output signal 220a, 220b, 220c, indicating the current DER power output. The DER output signals are provided to a DER outputs summation node 230, where the DER output signals are summed. The DER outputs summation node 230 provides a summed DER output signal to the DER aggregation overall real-time output error summation node 240, where the summed DER output signal is subtracted from the overall reference power signal provided by the optimization block 70 (see FIG. 1). The DER aggregation overall real-time output error summation node 240 outputs the overall power output error signal, which is provided to an auxiliary controller 260. The auxiliary controller 260 then process the overall power output error signal based on its specific design, which could be any suitable controller design such as, but not limited to, PI or PID, and outputs an overall DER aggregation control signal.

The DER output signals are also provided to DER controller summation nodes 270A, 270B, 270C, associated with DER1, DER2, DER3, respectively. The DER controller summation nodes are summation/subtraction functions in the controller that are embodiment in various software and hardware configurations for performing the computation. The overall DER aggregation control signal, output by the auxiliary controller 260, and the adjusted DER reference signal for DER3, the Swing DER in FIG. 2, are provided to DER3 controller summation node 270C, where the adjusted DER reference signal is added to the overall DER aggregation control signal and the output of DER3 is subtracted from the summation in order to calculate DER3 error signal. DER3 error signal is added to the adjusted reference power of DER2 at DER2 controller summation node 270B and the output of DER2 is subtracted from the summation in order to calculate DER2 controller error signal. Subsequently, DER2 error signal is added to the adjusted reference power of DER1 at DER1 controller summation node 270A and the power output of DER1 is subtracted from the summation in order to calculate DER1 controller error signal.

The DERs controllers summation nodes 270A, 270B, 270C then outputs DER error signal to DER1 Controller 250A, DER2 Controller 250B and DER3 controller 250C, respectively. The DER1 Controller 250A, DER2 Controller 250B and DER3 controller 250C then process their respective error signal in accordance with their specific controller design and outputs a control signal to each of DER1, DER2, DER3, respectively. In such a manner, each DER could adjust its power output in order to bring its actual power output to the level of its reference power output. Collectively, by adjusting their power outputs based on the control signal received from their respective controller output and based on the proposed method by which control signal are derived from different error signals, all DERs will contribute in bringing the overall DER aggregation output to the level of the overall reference power.

Figure 3:
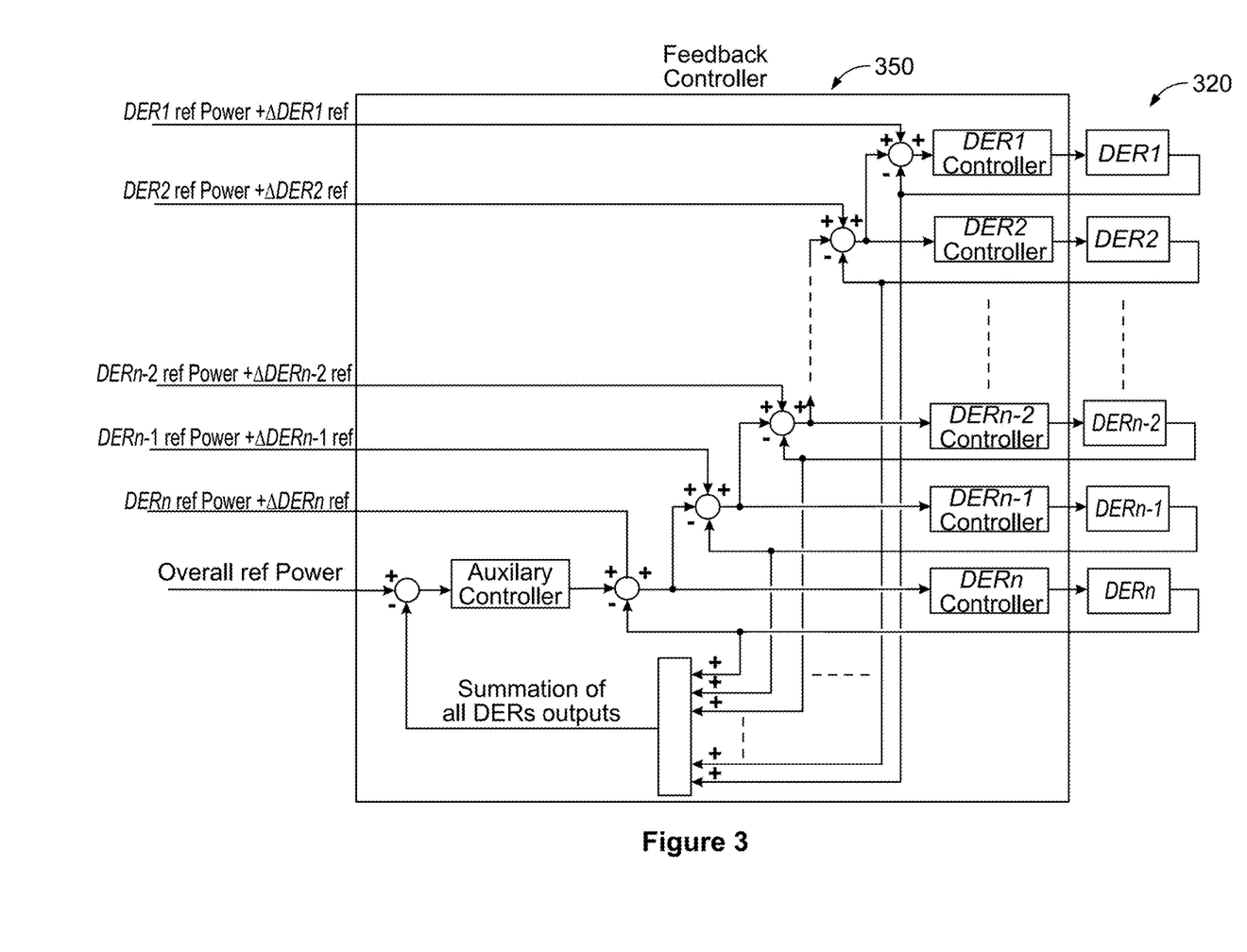
FIG. 3 is an illustration of a controller for a system containing n number of DERs.

FIG. 3 illustrates a controller 350 for a system having n number of DERs 320 according to an embodiment of the disclosure. In this system, the nth DER is the Swing DER. For example, referring back to FIG. 2, n=3, and the Swing DER is DER3. As discussed above, the assignment of a particular DER to a DER number is a design choice.

In an embodiment, the control process includes the following steps:
1. The error signal of the overall DER aggregation, called the overall power output error signal, is generated by node 240 by subtracting the summed DER output signal from the overall reference power signal provided by the optimization block 70.
2. The overall power output error signal is added to the adjusted reference signal of one preselected DER called the Swing DER. In the exemplary embodiment of FIG. 2, the swing DER is DER 3. The selection of the Swing DER is a design choice and could be based on DER capacity, ramp rate and other system specific characteristics.
3. DERs are arranged in a stack where the Swing DER represents the first DER in the stack as shown in FIG. 2. The specific arrangement of DERs in the stack is a design choice and could be based on DER capacity, ramp rate and other system specific characteristics.
4. The Swing DER error signal, which is the output of node 270C in FIG. 2, is added, at DER2 controller summation node 270B, to the adjusted reference signal of DER2 which is the next DER in the controller stack shown in FIG. 2.
5. Subsequently, each DER error signal is added to the adjusted reference signal of the next DER in the stack. In FIG. 2, DER 2 error signal is added, at DER controller summation node 270A, to the adjusted reference signal of DER 1.
6. Each DER controller, 250A, 250B and 250C in FIG. 1, will process the respective error signal created in the above steps and output respective control signal to each DER. These control signals respectively will cause each DER to adjust its output power to follow its adjusted reference power.

According to another embodiment of the invention, a computer program product is disclosed for performing the operations of the disclosed methods depicted in the flowcharts shown in FIGS. 1 and 2, and as described in the text of this disclosure. In an embodiment, a computer program product is disclosed for performing the operations of the disclosed methods for controlling the total output of an aggregation of DERs to maintain it within an acceptable error margin from an overall reference power output required by a requestor such as utility/ISO/RTO or other third party aggregator. In an embodiment, the computer program product is embedded within a non-transitory computer readable storage medium readable by a processor of a computer and configured to store instructions for execution by the processor for performing a method including:

a) generating an error signal of the overall DER aggregation, called the overall power output error signal, by subtracting the summed DER output signal from the overall reference power signal provided by an optimization block, b) adding the overall power output error signal to the adjusted reference signal of one preselected DER called the Swing DER. In the exemplary embodiment of FIG. 2, the swing DER is DER 3. The selection of the Swing DER is a design choice and could be based on DER capacity, ramp rate and other system specific characteristics, c) arrange DERs in a stack where the Swing DER represent the $n^{th}$ DER in the stack, DER3 as shown in FIG. 2. The specific arrangement of DERs in the stack is a design choice and could be based on DER capacity, ramp rate and other system specific characteristics, d) adding the Swing DER error signal, which is the output of node 270C in FIG. 2, to the adjusted reference signal of DER2, which is the next DER in the stack as shown in FIG. 2, at DER2 controller summation node 270B, e) adding each DER error signal to the adjusted reference signal of the next DER in the stack. In FIG. 2, DER 2 error signal is added, at DER controller summation node 270A, to the adjusted reference signal of DER 1, f) inputting the above created error signal to the respective DER controller, 250 A, 250 B and 250 C in FIG. 1 and send the respective output control signal to each DER. These control signals respectively will cause each DER to adjust its output power to follow its adjusted reference power, g) outputting a DER control signal to adjust the power level of one or more DERs.

Additional executable steps are as described in the method description described in this disclosure.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Figure 4:
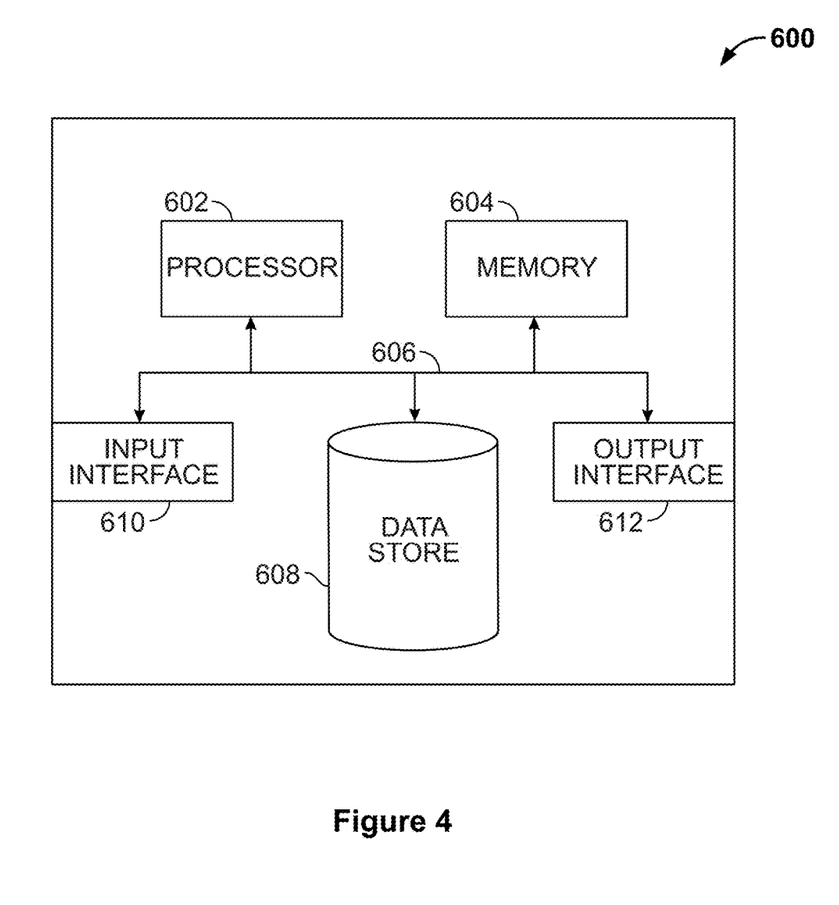
FIG. 4 is an illustration of an exemplary computing device that can be used in accordance with the system and methodology disclosed herein.

Now referring to FIG. 4, a high-level illustration of an exemplary computing device 600 that can be used in accordance with the system and methodology disclosed herein is illustrated. For instance, the computing device 600 may be used in a system that supports computing at least on parameter of an electric power storage device that is to be included in a collective microgrid. In another example, at least a portion of the computing device 600 may be included in power electronics with customized parameters. The computing device 600 includes at least one processor 602 that executes instructions that are stored in a memory 604. The memory 604 may be or include RAM, ROM, EEPROM, Flash memory, or other suitable memory. The instructions may be, for instance, instructions for implementing functionality described as being carried out by one or more components discussed above or instructions for implementing the method described above. The processor 602 may access the memory 604 by way of a system bus 606. In addition to storing executable instructions, the memory 604 may also store models of microgrids, parameters of modules of microgrids, etc.

The computing device 600 additionally includes a data store 608 that is accessible by the processor 602 by way of the system bus 606. The data store may be or include any suitable computer-readable storage, including a hard disk, memory, etc. The data store 608 may include executable instructions, models of microgrids, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a portion of a distributed system. Thus, for instance, several devices may be in communication by way of a network connection and may collectively perform tasks described as being performed by the computing device 600. It is noted that several examples have been provided for purposes of explanation. These examples are not to be construed as limiting the hereto-appended claims. Additionally, it may be recognized that the examples provided herein may be permutated while still falling under the scope of the claims.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system, comprising:

an optimization block that receives an overall power request from an operator and outputs an overall reference power signal and at least one individual power source request for a corresponding at least one individual power source of one or more power sources;

a unit commitment processor that receives at least one individual power source status comprising current power level from the corresponding at least one individual power source and generates and outputs a delta reference power signal for the corresponding at least one individual power source, wherein the delta reference power signal corresponds to an amount of power to be added to one or more of the one or more individual power sources to bring total power of the one or more power sources to equal an overall reference power level of the at least one individual power source;

a summation node that receives the at least one individual power source request for a corresponding at least one individual power source, and also receives the delta reference power signal for the corresponding at least one individual power source, and outputs an adjusted reference power signal that is the sum of the at least one individual power source request and the delta reference power signal for the corresponding at least one individual power source;

a controller that receives the overall reference power signal from the optimization block, and also receives the adjusted reference power signal for the at least one individual power source, and also receives a power status comprising an indication of current power level of the at least one individual power source, and outputs a power command signal to the at least one individual power source;

wherein the system is configured to integrate power output tracking errors to continuously re-assign and dynamically control the at least one individual power source of distributed energy resources to maintain an overall reference power output of the distributed energy resources within a defined error margin; and wherein the at least one power source is selected from a group consisting of solar, geothermal, wind, water, hydraulic and storage power sources that output energy to an electrical grid.

2. The system of claim 1, wherein the power command signal comprises an indication of online status or operational schedule.

3. The system of claim 1, wherein the controller is selected from a group consisting of a proportional-integral controller and a proportional-integral-derivative controller.

4. The system of claim 1, wherein the operator is selected from a group consisting of utility, grid operator, independent system operator, regional transmission organization and electrical market operator.

5. A method, comprising:
receiving an overall power request for a grid from a user into a management system;
receiving a status from at least one distributed energy resource into the management system;
receiving a distributed energy resource output comprising an indication of current power level from the at least one distributed energy resource; and
calculating a distributed energy resource control signal and sending the distributed energy resource control signal to the at least one distributed energy resource;
wherein the distributed energy resource control signal is calculated by a process comprising:
determining a difference in an amount of power generated by the distributed energy resource and a set point amount of power for the distributed energy resource;
summing the difference with an initial set point amount of power for the distributed energy resource to generate a delta reference power amount;
adding the delta reference power amount to a reference power level amount to generate an adjusted power level amount for the at least one distributed energy resource;
calculating a power level for the at least one distributed energy resource from an overall reference power level for the grid, the adjusted power level amount for the at least one distributed energy resource, and the status from at least one distributed energy resource; and
communicating the power level for the at least one distributed energy resource to the at least one distributed energy resource;
wherein the system is configured to integrate power output tracking errors to continuously re-assign and dynamically control the at least one individual power source of distributed energy resources to maintain an overall reference power output of the distributed energy resources within a defined error margin.

6. The method of claim 5, wherein the power level is calculated by a controller using a control method selected from a group consisting of proportional-integral control and proportional-integral-derivative control.

7. The method of claim 5, wherein the at least one distributed energy resource is selected from a group consisting of solar, geothermal, wind, water and storage power sources.

8. The method of claim 5, wherein the status from at least one distributed energy resource comprises an online status or operational schedule of the at least one distributed energy resource.

9. A computer program product stored on a non-transitory computer readable medium, wherein executed by a process, the computer program product configured to:
determine a difference in an amount of power generated by the distributed energy resource and a set point amount of power for the distributed energy resource;
sum the difference with an initial set point amount of power for the distributed energy resource to generate a delta reference power amount;
add the delta reference power amount to a reference power level amount to generate an adjusted power level amount for the at least one distributed energy resource;
calculate a power level for the at least one distributed energy resource from an overall reference power level for the grid, the adjusted power level amount for the at least one distributed energy resource, and the status from at least one distributed energy resource;
wherein the calculated power level is communicated to the distributed energy resource to set power level of the distributed energy resource in an electrical grid; and
wherein the system is configured to integrate power output tracking errors to continuously re-assign and dynamically control the at least one individual power source of distributed energy resources to maintain an overall reference power output of the distributed energy resources within a defined error margin.

10. The computer program product of claim 9, wherein the distributed energy resource is selected from a group consisting of solar, geothermal, wind, water and storage power sources.

* * * * *